United States Patent [19]

Roshitsh et al.

[11] Patent Number: 5,241,695
[45] Date of Patent: Aug. 31, 1993

[54] MOLDED SHIELD WITH INTEGRAL KEY SWITCH CIRCUITRY

[75] Inventors: Todd W. Roshitsh, Coral Springs; David I. Blatt, Margate; James W. Maginness, Coral Springs, all of Fla.

[73] Assignee: Motorola, Inc., Schaumburg, Ill.

[21] Appl. No.: 799,466

[22] Filed: Nov. 26, 1991

[51] Int. Cl.$^5$ .................................... H04B 1/08
[52] U.S. Cl. ............................ 455/128; 455/344; 455/349; 455/350; 361/814; 361/816
[58] Field of Search ............... 455/128, 344, 347, 349, 455/350; 341/22; 200/305; 361/422, 424

[56] References Cited

U.S. PATENT DOCUMENTS

| | | | |
|---|---|---|---|
| 3,877,029 | 4/1975 | Larson et al. | 341/22 |
| 3,959,610 | 5/1976 | Finnegan et al. | 200/5 A |
| 4,225,970 | 9/1980 | Jaramillo et al. | 455/351 |
| 4,456,800 | 6/1984 | Holland | 200/305 |
| 4,621,373 | 11/1986 | Hodsdon | 455/89 |
| 4,719,322 | 1/1988 | Guzik et al. | 455/351 |
| 4,791,527 | 12/1988 | Brown | 361/424 |
| 4,794,489 | 12/1988 | Brown | 361/424 |
| 4,894,663 | 1/1990 | Urbish et al. | 343/702 |
| 4,922,070 | 5/1990 | Dorinski | 200/512 |
| 4,939,792 | 7/1990 | Urbish et al. | 455/347 |
| 5,045,820 | 9/1991 | Leicht et al. | 333/26 |
| 5,150,282 | 9/1992 | Tomura et al. | 361/424 |
| 5,153,590 | 10/1992 | Charlier | 341/22 |

OTHER PUBLICATIONS

*Connection Technology* "Update: Three-Dimensional Molded Interconnec" by Sharon MacCorquodale, pp. 23–25, Jun. 1990.

*EMC Technology* "Coated Plastics Offer Shielding and Savings" by Richard Brander, Peter Kuzyk and Richard Bellemare of Ethon OME, Inc., pp. 37–40, Jul.-/Aug., 1990.

*Primary Examiner*—Reinhard J. Eisenzopf
*Assistant Examiner*—Timothy H. Keough
*Attorney, Agent, or Firm*—Pedro P. Hernandez

[57] ABSTRACT

The molded key switch shield assembly (100) includes a molded member (104) and a key switch overlay (102). The molded member (104) includes a shield metallization pattern (136) which substantially covers major portions of both the first (138) and second major surfaces (140) of the molded member (104). The molded member also includes a metallization pattern (124) having a plurality of key switch locations (118) which can be shorted by conductive locations (112) on key switch overlay (102).

6 Claims, 3 Drawing Sheets

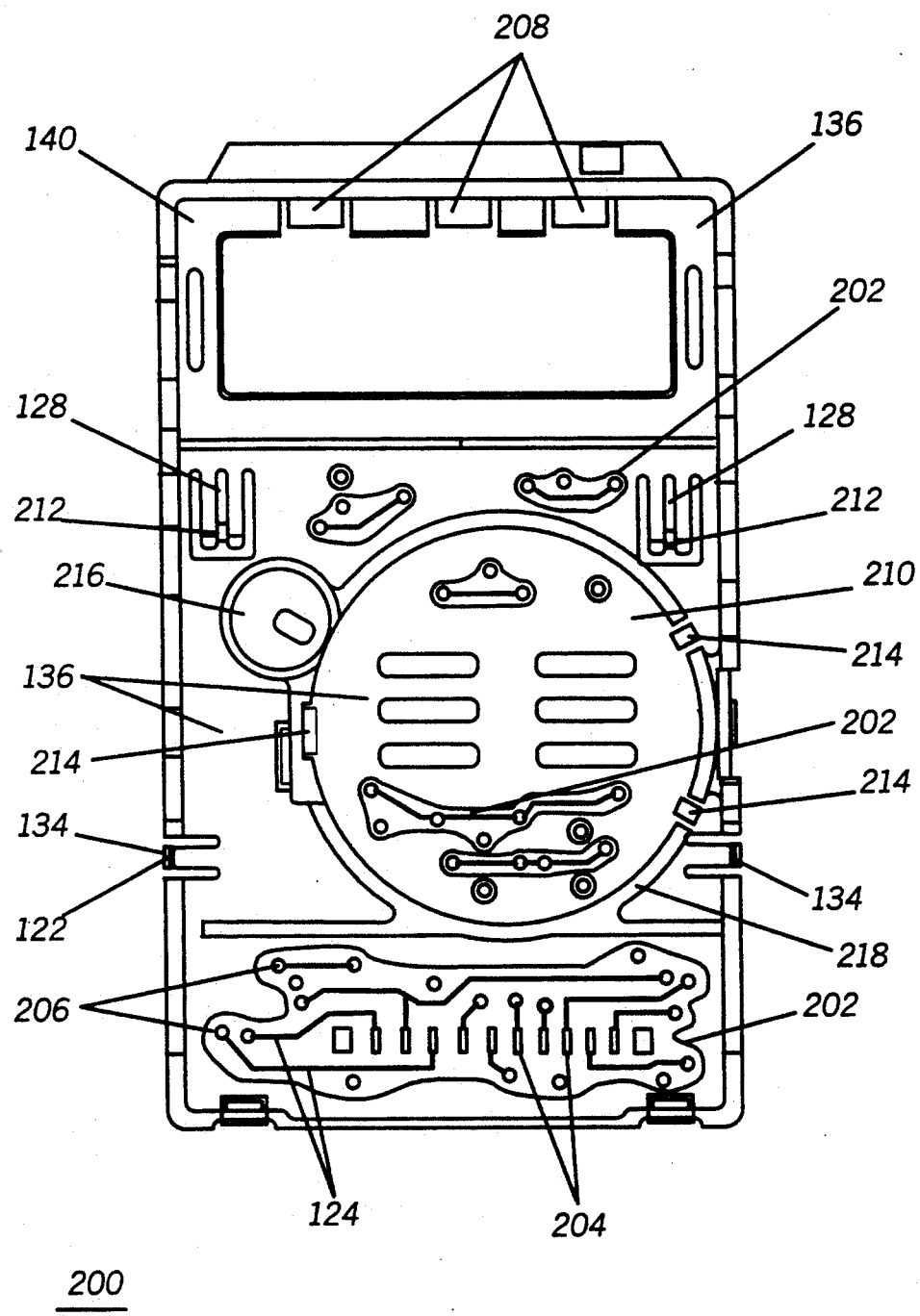

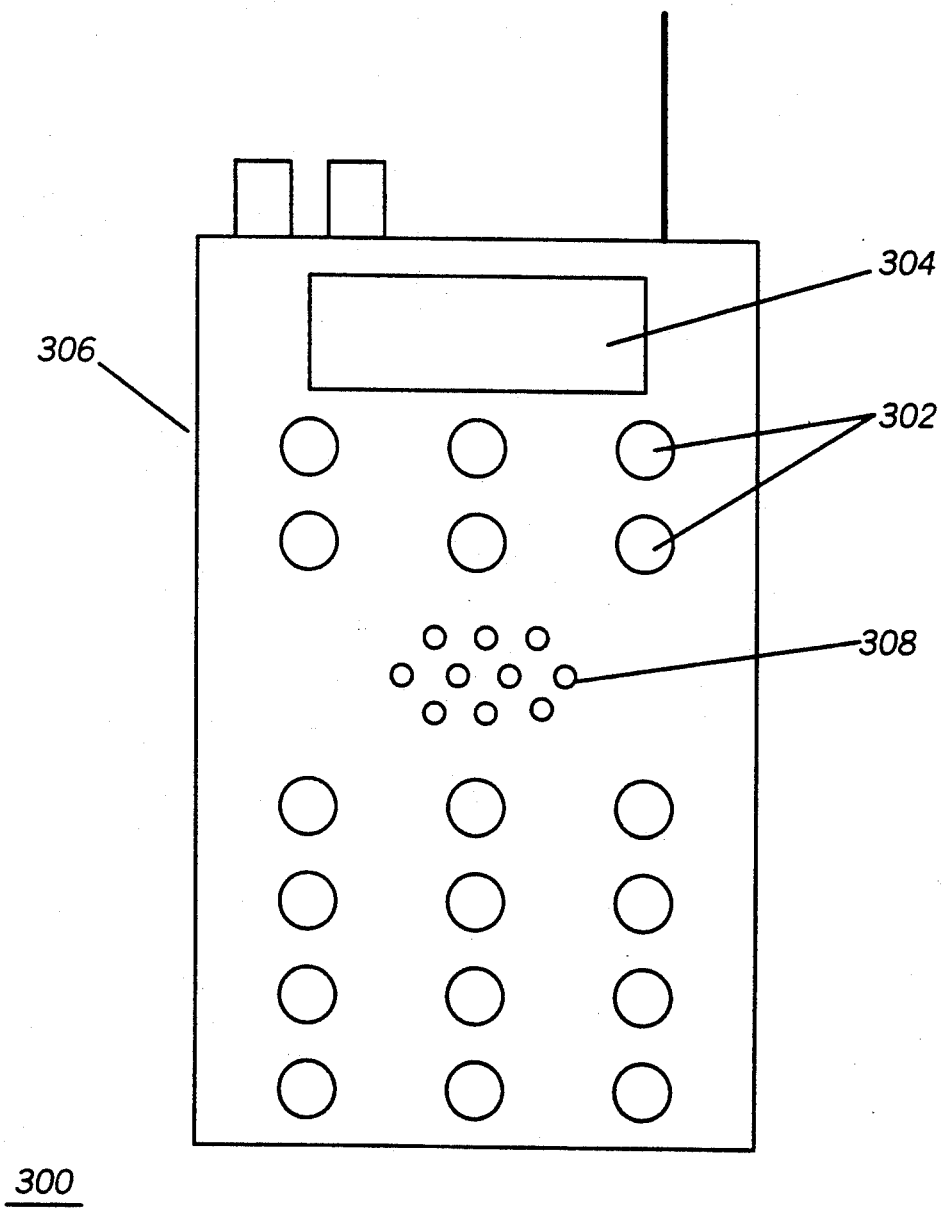

MOLDED SEIELD WITH INTEGRAL KEY SWITCH CIRCUITRY

TECHNICAL FIELD

This invention relates generally to molded shield assemblies, and more specifically to a molded shield with integral key switch circuitry.

BACKGROUND

In portable radio applications, internal radio components contained inside of the radio housing are usually shielded in order to prevent electromagnetic and radio interference (EMI/RFI) from affecting the radio's electronic circuits. This also prevents any radio-generated interference (e.g., microprocessor clock-generated signals) from affecting external electronic devices (e.g., computer equipment located in close proximity to the radio).

It is very difficult and expensive to shield the internal radio electronics when the radio also includes a keyboard and other user controls. Presently, some radios with keyboards use a metal shield with a costly multilayer membrane switch (multilayer flexible circuit) assembly on top of the metal shield to provide shielding and a keypad structure for the radio. This approach not only is very expensive to manufacture, but also increases the chances of keyboard assembly failure. The failures occur when the flexible circuits ("flex") must be folded around the metal shield in order to interconnect to the radio electronics mounted within the radio chassis. A need thus exists for a shielded assembly which can provide for increased reliability and reduced manufacturing cost. The shield assembly must also provide for maximum attenuation of EMI and RFI in order to enhance the operation of the communication device.

SUMMARY OF THE INVENTION

Briefly, according to the invention a molded key switch shield provides for a simplified way of providing for both a shield and key switch circuit.

In one aspect of the invention, the molded key switch shield includes a molded member having first and second major surfaces. A key switch metallization pattern is located on the first major surface of the molded member, the key switch metallization pattern includes a switch contact location. Finally, the molded member includes a ground shield metallization pattern which is selectively disposed on a substantial portion of the molded member and which is capable of being coupled to a ground potential.

In another aspect of the invention, a molded key switch shield assembly is described which includes the above-mentioned molded key switch shield and a key switch overlay.

BRIEF DESCRIPTION OF THE DRAWINGS

FIG. 2 shows a rear view of the molded shield in accordance with the present invention.

FIG. 3 shows a portable radio utilizing the present invention.

DETAILED DESCRIPTION OF THE PREFERRED EMBODIMENT

Figure 1:
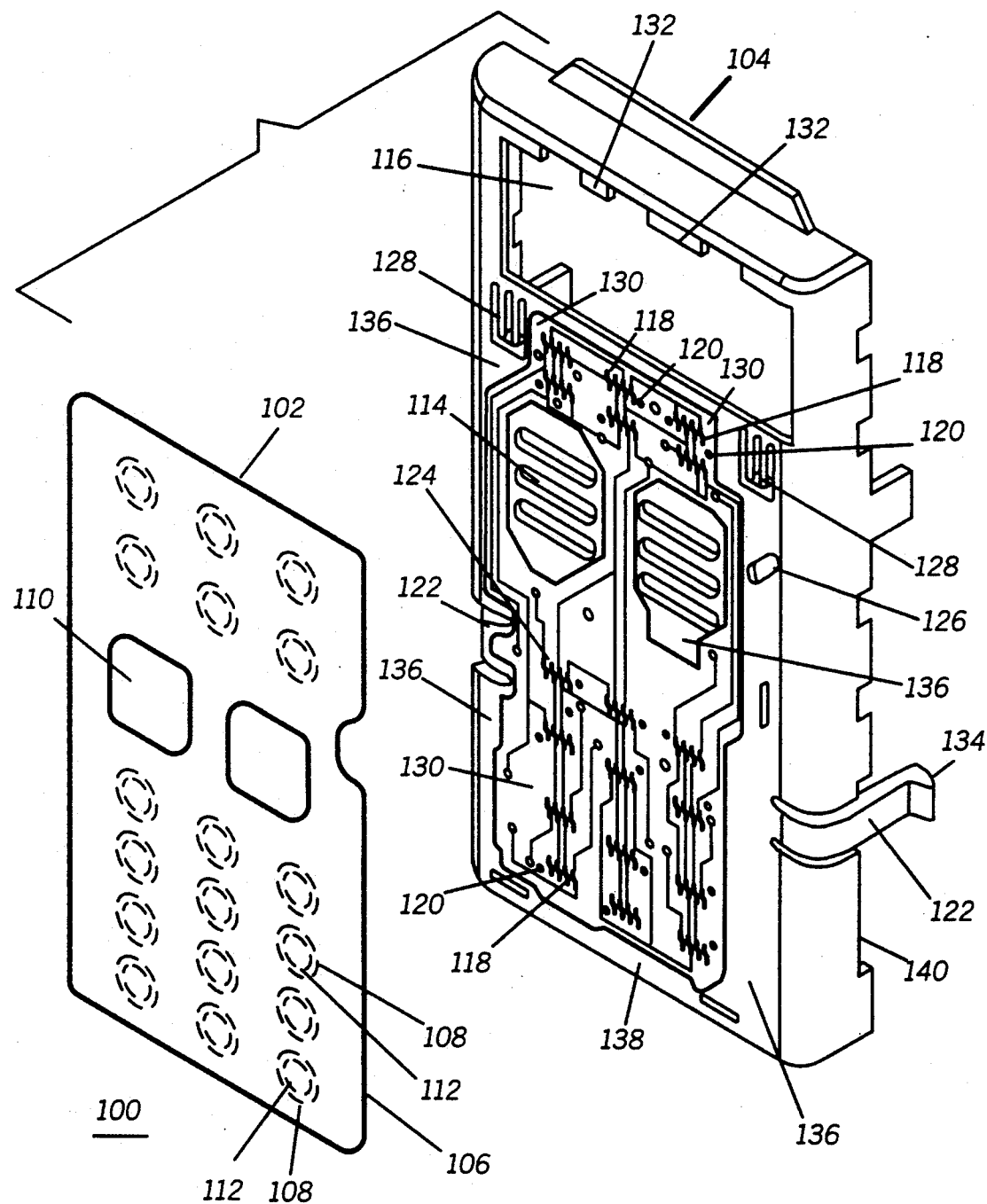
FIG. 1 shows an exploded view of a molded shield with integral key switch circuitry and key switch overlay in accordance with the present invention.

Referring now to the drawings and in particular to FIG. 1, there is shown an exploded view of a key switch assembly 100 in accordance with the present invention. The key switch assembly 100 includes a molded shield 104 and key switch overlay 102. The key switch shield 104 is preferably molded from a polyetherimide such as Ultem 2212 or other similar thermosets or thermoplastics. Metal traces 124 are imaged onto the first 138 and second 140 surfaces of molded shield 104 to form an eighteen key switch metallization pattern 124. The metal traces on the first 138 and second 140 major surfaces are electrically interconnected by metallized vias.

Each of the key switch locations includes a switch contact location 118 which forms the switch contacts for the key switch metallization pattern 124. The switch contact locations 118 (switch trace metallization patterns) form triple pole switch contacts which are preferably screened over with conductive ink or other conductive material in order to enhance their "shorting" capabilities. This provides for switch locations 118 which can be shorted by using conductive shorting dots 112 found on the key switch overlay 102. In close proximity to each of the switch contact locations 118 are vent holes 120 which allow for each of the sealed switch locations 108 to vent once key switch overlay 102 is bonded to the molded shield 104. Vent holes 120 prevent a vacuum from being created which would affect the operation of the key switch circuitry.

The majority of the ground shield metallization patterns (surface areas) 136 of molded shield 104 are plated with electrically conductive material in order to provide for maximum shielding for the radio. The electrically conductive plated surfaces 136 are in turn coupled to the radio chassis (not shown) ground potential. Resilient fingers 134 provide retention between the radio chassis and molded shield 104. Only small surface areas 130 around the traces 124 on first major surface 138 of shield 104 are not plated, these areas are kept to a minimum in order to enhance shielding. Similarly, second major surface 140 is also substantially plated in order to form a grounded shield which maximizes the EMI/RFI attenuation capabilities of molded shield 104. The molded shield 104 is plated using conventional plastic plating techniques known in the art. Preferably, shield 104 is first passed through an electroless copper plate process which is then followed by electroplating of copper and Tin/Lead and then the selective imaging of the metallization.

Molded shield 104 also includes speaker vents (speaker ports) 114 and a display opening (cavity or port) 116. The display section of shield 104 includes a display support means comprising fixed display supports 132 and resilient fingers 128 which engage with the display section (not shown) and retain it in place. The display opening 116 is provided for the display (not shown) in order to allow for viewing of the display surface. Preferably, the display which is placed in the display cavity includes a grounded back plane in order to maximize overall shielding of the finished assembly.

A microphone port 126 is provided as part of the shield in order to port the microphone which is retained in the back surface 140 of shield 104. Two main spring fingers 122 having snaps 134 retain the overall molded shield assembly 100 in place when assembly 100 is united to the rest of the radio housing (not shown).

Spring fingers 122 also allow for the molded shield 104 to make a pressure fit contact with ground potential contact locations found on the radio chassis.

In the preferred embodiment, key switch overlay 102 includes pressure sensitive adhesive on its rear surface 106. The keypad overlay can be manufactured from polyester, polyimide, or some other common thermoplastic or thermoset. Overlay 102 electrically insulates the exposed traces (metallization pattern) 124 and switch contact locations 118 on shield 104, and prevents abrasion or contamination of the key switch contacts 118 once it is attached to molded member 104. Overlay 102 further includes speaker porting cavities 110 for allowing the audio generated by the radio speaker to be heard.

Conductive sections ("dots") 112 formed from conductive ink such as carbon impregnated ink and which are selectively dispensed on overlay 102, "short" their corresponding key switch traces 118 once overlay 102 is bonded to shield 104 and conductive sections 112 are depressed by a keypad actuator. In the preferred embodiment, a rubber keypad (not shown) is placed with the radio housing (not shown) such that the keypad actuators (individual keys) have access to key switch overlay 102 through holes in the radio housing, in order to actuate the corresponding conductive sections 112. Once a key on the rubber keypad is actuated, the compression causes the corresponding conductive dot 112 to press against its corresponding switch trace 118 on shield 104, thereby creating a electrical short which is detected by the radio electronics. Each of the conductive dots 112 are deposited on a single layer polyester section 108 (compressible section) which does not have adhesive on rear surface 106. Conductive sections 112 are placed on single layer sections 108 while the rest of keypad overlay 102 is formed by placing a second layer of polyester or other suitable material, thereby providing some space between shorting dots 112 and their corresponding switch contact locations 118. A vent hole 120 is located near each of the switch contact locations 118 positioned inside of compressible area 108. Each vent hole 120 provides for a smoother compression and retraction of its corresponding switch compressible area 108. Vent holes 120 prevent the sticking of the compressible areas 108 against the molded shield 104 by avoiding any vacuum effects from being created.

Another way of "shorting" the key switch traces 118 on molded shield 104 can be achieved by using a rubber keypad which has conductive plungers thereby eliminating overlay 102 entirely. The design approach taken will depend on many factors, some of which are, whether the radio is of the "slide-in" design or not (i.e, does the radio electronic assembly slide into the radio housing, or is it of the type that uses an approach where the electronics are placed in one portion of the radio housing and then another section of the radio housing is secured to the first portion), etc. Overlay 102 provides the major advantage of protecting the metallization patterns 124 found on first major surface 138 and secondly providing protection for the key switch contact locations 118.

In FIG. 2, a rear view 200 of molded shield 104 is shown. The rear view 200 shows rear display retaining members 208 and the snaps 212 which are found at the end of resilient display retention fingers 118. A speaker location portion 210 is provided in order to accommodate the radio speaker which is secured to the rear of shield 104 by a speaker support means comprising catches 214 and a speaker ledge 218 which surrounds the circumference of the speaker. Speaker ledge 218 is approximately 0.08 inch in height. Also seen are snaps 134 which are found at the end of main spring fingers 122. Snaps 134 mate with recesses on the radio chassis (not shown) and help retain molded shield 104 to the radio chassis. Once mated to the radio chassis, molded shield 104 makes ground contact with the radio chassis along a substantial portion of all surface areas where the molded shield 104 and radio chassis come in contact to each other, thereby providing a very well shielded radio chassis for the internal radio electronics.

A microphone support means such as microphone support location 216 is also provided for securing a conventional microphone to shield 104. The microphone support location is approximately 0.15 inch in height and having an inner cavity diameter of approximately 0.30 inch. Key switch interconnect contact pads 204 which interface through a flexible connector (not shown) provide for the interconnection of the key switch metallization pattern 124 found on shield 104 to be coupled to the rest of the radio circuitry.

Metal plating (ground shield) 136 forms a ground plane once shield 104 is coupled to the rest of the radio and maximizes EMI/RFI shielding for the keypad structure. Unplated areas 202 are minimized as much as possible and are only found around circuit traces in order to provent shorting of the metallized traces to the grounded shield areas 136. Electrically-conductive plated vias 206 interconnect the traces found on the first major surface 138 to the rear or second major surface 140.

The display section (not shown) is supported by front fixed display supports 132 (shown in FIG. 1) and rear fixed display supports 208 which support the top of the display section. The bottom portion of the display section is supported by resilient fingers 128 which apply upward pressure to the display section and have snaps 212 which retain the display section. The display section is placed into molded shield 104 by first placing the top portion of the display section between fixed display supports 132 and 208. Next, the display section is pressed against the molded shield 104 which causes resilient fingers 128 to be forced downward allowing the display section to engage into position. Once the display section clears the resilient fingers (display section is in position against the molded shield) the resilient fingers 128 spring back into position locking the display section with snaps 212.

In FIG. 3, a front view of a portable two-way radio 300 utilizing the present invention is shown. Radio housing 306 provides retention for a rubber keypad member with individual key actuators that extend through housing 306 and that have access to key switch overlay 102. When the radio user presses any radio key 302, it causes the corresponding switch compressible area 108 to compress and press the key switch membrane 102. This causes the corresponding shorting location ("dot") 112 to electrically short its corresponding key switch location 118. Radio 300 includes a conventional liquid crystal or other type of display 304. Speaker and microphone porting cavities 308 are provided on radio housing 306 in order to provide audio porting to the microphone and from the speaker which are attached to the molded shield 104.

In summary, the invention provides for a molded member 104 which functions as a key switch circuit board and also an effective EMI/RFI shield. Since the molded member 104 is copper plated on virtually all exposed surfaces 136 which surround the metallization patterns 124, it provides for an effective ground shield. This one piece multi-functional invention results in substantial savings in total product cost compared to more conventional approaches, which typically consist of separate components for the keyboard and shield. The molded shield also provides for improved structural rigidity and dimensional stability compared to sheet metal shields. The molded shield 104 when combined with a key switch overlay 102, replaces costly multilayer membrane switch designs used on some radios. This approach also provides the advantage of eliminating the interconnection of ground layer shielding typically found on membrane switch designs since the molded shield 104 makes ground contact once it is fastened to the rest of the radio chassis.

What is claimed is:

1. A molded key switch shield, comprising:
    a molded member having first and second major surfaces;
    a key switch metallization pattern located on the first major surface of the molded member, the key switch metallization pattern including a switch contact location;
    a shield metallization pattern which substantially covers the first and second major surfaces of the molded member is selectively disposed on the molded member for coupling to a ground potential;
    a display support means which includes a plurality of resilient leg members for supporting a display against the molded member;
    the molded member including a microphone support means for supporting a microphone;
    a speaker support means located on the second major surface for supporting a speaker against the molded member; and
    a plurality of speaker cavities located on the molded member for porting the speaker and a microphone cavity for porting the microphone.

2. The molded key switch shield of claim 1 wherein the switch contact location has conductive material disposed on at least part of its exposed surface.

3. A molded key switch shield assembly, comprising:
    a molded member having first and second major surfaces;
    a key switch metallization pattern located on the first major surface of the molded member, the key switch metallization pattern including a plurality of switch contact locations, the key switch metallization pattern substantially covers the first and second major surfaces of the molded member;
    a shield metallization pattern which is selectively disposed on the molded member for coupling to a ground potential; and
    a key switch overlay including a plurality of conductive sections, the conductive sections being located within compressible key actuation sections, the key switch overlay being attached to the first major surface of the molded member with the plurality of conductive sections being in substantial register with the plurality of switch contact locations; and
    the molded member includes a plurality of vent cavities one located in close proximity to each of the plurality of switch contact locations for venting the compressible key actuation sections of the key switch overlay.

4. The molded key switch shield assembly of claim 3, wherein the plurality of switch contact locations have conductive material disposed on their exposed surfaces.

5. A radio, comprising:
    a radio housing; and
    a molded key switch shield coupled to the radio housing, the molded key switch shield, comprising:
        a molded member having first and second major surfaces;
        a key switch metallization pattern located on the first major surface of the molded member, the key switch metallization pattern including a plurality of switch contact locations;
        a shield metallization pattern which substantially covers the first and second major surfaces of the molded member is selectively disposed on the molded member for coupling to a ground potential;
        a display support means which includes a plurality of resilient leg members for supporting a display against the molded member;
        the molded member including
            a microphone support means for supporting a microphone;
            a speaker support means located on the second major surface for supporting a speaker against the molded member; and
            a plurality of speaker cavities for porting the speaker and a microphone cavity for porting the microphone.

6. The radio of claim 5, wherein the plurality of switch contact locations have conductive material disposed on at least part of their exposed surfaces.

* * * * *